March 1, 1927.
J. MARTIKAINEN
CULTIVATOR
Filed Aug. 17, 1921
1,619,797
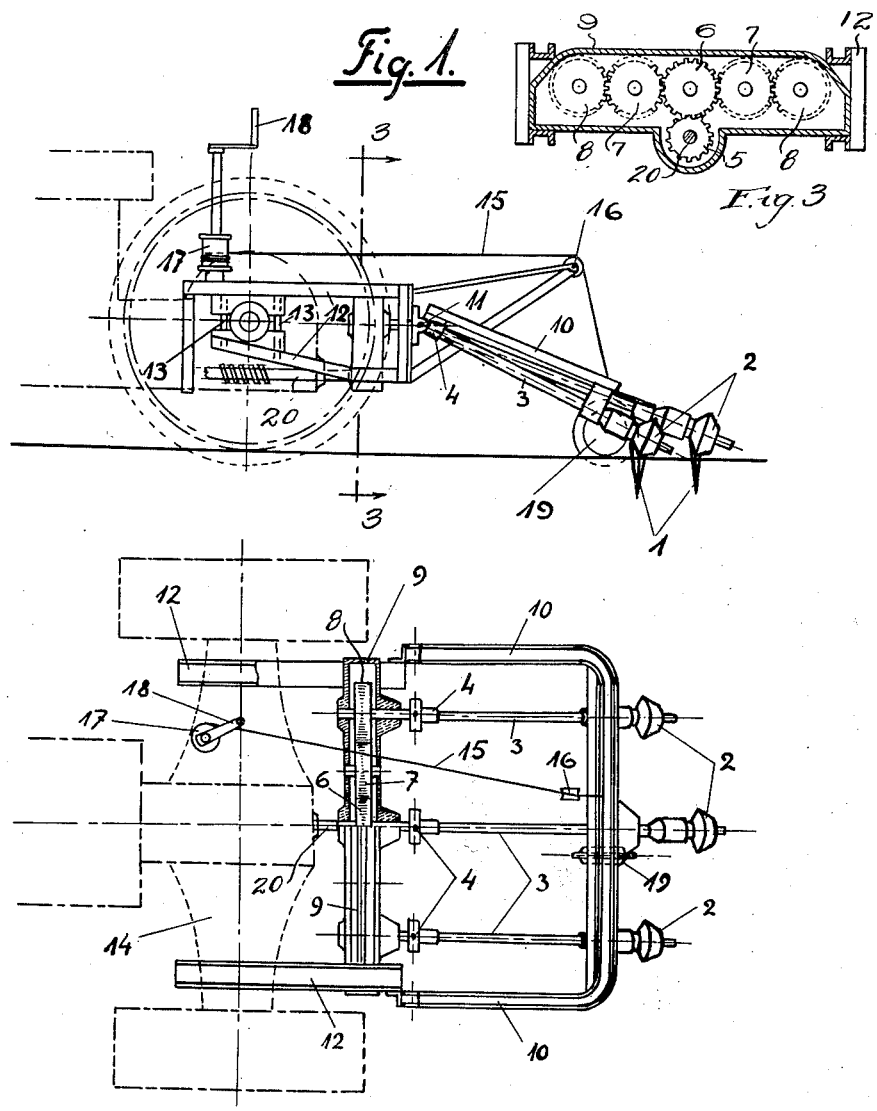
Inventor:
Janne Martikainen
By Lawrence Langner
Attorney Patented Mar. 1, 1927.

1,619,797

UNITED STATES PATENT OFFICE.

JANNE MARTIKAINEN, OF RYTTYLA, FINLAND, ASSIGNOR TO J. ALFRED ANDERSON, OF SUFFOLK COUNTY, MASSACHUSETTS.

CULTIVATOR.

Application filed August 17, 1921. Serial No. 493,020.

This invenion relates to a rotary plow attachment, and more particularly to one of this class, that is applicable to existing tractors, such for instance as the well known Fordson.

It is an object of the invention to produce a simple and effective plow attachment of such arrangement that it may be applied to existing tractors for temporary or extended use, and which may be applied thereto by simple means not requiring physical changes in the said tractor, or the services of a skilled mechanic to accomplish the attaching thereof.

It is a further object of the invention to produce a simple plow attachment for tractors, the cutting portions of which may have vertical movement relatively to the tractor when operating on rough or hilly ground.

A further object of the invention is the production of a plow attachment which not only loosens the soil and thereby accomplishes the purpose of a plow, but which also pulverizes the soil thus loosened, and thereby accomplishes the purpose of a harrow.

To the attainment of the above objects the invention consists in certain novel features of construction and arrangement of parts which will be fully understood from a description of the drawings and the claim hereinafter given.

Referring to the drawings:

Figure 1 represents in side elevation, in diagrammatic manner, a plow attachment embodying the invention, and of a construction applicable to the well known Fordson tractor.

Figure 2 is a top plan view of Figure 1 certain of the parts being broken away.

Figure 3 is a detail partly in section taken on approximately the line 3—3 Figure 1.

Like characters represent like parts throughout the several figures of the drawings:

The drawings herewith illustrate the invention in one of the many forms in which it may be applied and it will be understood that it is not intended to limit it to the precise construction and arrangement shown as various changes might be made therein without departing from its spirit and scope.

The cutting blades or knives two of which are conventionally shown in Figure 1 of the drawings as mounted on heads 2, are preferably flat thin blades detachably mounted to said heads.

The frame 10 is adapted to be raised and lowered by means of a rope or chain 15 passing over a suitably supported pulley 16, to a drum 17 operated through the hand crank 18.

During the plowing operation the frame 10 will assume the position shown in Figure 1 wherein the said frame at its rear end is supported by the wheel 19, the chain 15 being sufficiently slack to permit of hinge movement between the tractor and said frame when working over uneven or humpy ground.

The drawing Figure 2 shows three cutter heads 2 and three shafts 3 to drive them, and they derive their power from the worm shaft 20, of the tractor 14 see Figure 1, which may be extended to enter the casing 9 in which is located a gear 5, fast on said shaft 20, and in mesh with the gear 6 the shaft of which extends rearwardly and is coupled to the center one of the shafts 3, by a flexible coupling 4.

The said casing 9 also houses the intermediate or idler gears 7 each of which meshes with a gear 8 the shafts of which also extend rearwardly and are coupled to the wing shafts 3 by similar couplings 4.

From the foregoing it will be seen that the cutters or knives 1 receive their power from the tractor worm shaft, through the gear train and flexible couplings, and shafts 3.

The frame 10 is pivoted at 11 to the rigid frame 12 which in turn is secured to the tractor 14 by the bolts 13, and strap 13ˣ as seen in Figure 1 of the drawings.

I claim:

A cultivator arranged to be connected to and operated by a tractor and comprising a frame arranged to be rigidly attached to the rear of a tractor; a second frame arranged to be pivotally mounted on said rigid frame; a plurality of shafts mounted in said second frame; a gear train mounted on said rigid frame and arranged to be driven by a worm shaft of said tractor, certain of the gears of said train having shafts rearwardly extending therefrom which have flexible coupling connection with the shafts mounted in said second frame whereby said pivoted frame and said shafts mounted therein may be raised and lowered, each of said shafts of said second frame having cutting heads mounted thereon.

In testimony whereof I affix my signature.

JANNE MARTIKAINEN.